(12) United States Patent
Fadavi-Ardekani et al.

(10) Patent No.: US 6,297,751 B1
(45) Date of Patent: Oct. 2, 2001

(54) LOW-VOLTAGE JOYSTICK PORT INTERFACE

(75) Inventors: Jalil Fadavi-Ardekani, Newport Coast; Raymond S. Livingston, Bonny Doon, both of CA (US); Richard J. Niescier, Bethlehem; David L. Potts, Royersford, both of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/113,503

(22) Filed: Jul. 10, 1998

(51) Int. Cl.[7] ...................................................... H03L 5/00
(52) U.S. Cl. .......................... 341/20; 327/100; 327/142; 327/333; 345/101
(58) Field of Search .............................. 341/20; 345/161, 345/212, 163; 710/18, 73, 2, 8, 37, 101; 327/333, 100, 142; 463/73

(56) References Cited

U.S. PATENT DOCUMENTS

| | | | |
|---|---|---|---|
| 4,886,941 | * 12/1989 | Davis | ...................................... 178/18 |
| 5,821,924 | * 10/1998 | Kikinis | ................................. 345/212 |
| 5,867,051 | * 2/1999 | Liu | ....................................... 327/333 |
| 5,874,944 | * 2/1999 | Khoury | ................................. 345/161 |
| 5,920,734 | * 2/1999 | Holmdahl | .............................. 710/73 |
| 5,991,830 | * 11/1999 | Beard | .................................... 710/18 |

* cited by examiner

Primary Examiner—Michael Horabik
Assistant Examiner—Albert K. Wong

(57) ABSTRACT

The joystick port interface includes an integrated circuit receiving an analog joystick position measurement signal and outputting a digital pulse signal to a processor which signifies a joystick coordinate value. The integrated circuit includes a pulse generator and a bidirectional buffer circuit. The bidirectional buffer circuit receives the analog joystick position measurement signal and selectively discharges an RC network capacitor which provides this analog measurement. This implementation provides a joystick port which uses low-voltage CMOS VLSI structures which can interface a conventional high-voltage joystick with the processor.

19 Claims, 2 Drawing Sheets

LOW-VOLTAGE JOYSTICK PORT INTERFACE

BACKGROUND OF THE INVENTION

1. Field of the Invention

The present invention relates to a low-voltage joystick port interface and a method of interfacing a standard-voltage joystick with a low-voltage port of a processor.

2. Description of Prior Art

As a peripheral device, a user manipulated joystick enables the real-time interaction between a user and a host computer which is necessary for certain computer applications (e.g., computer games). The joystick typically includes a potentiometer for each orthogonal coordinate axis. The resistance of the potentiometer varies in direct relation to the joystick handle position along the corresponding coordinate axis. Each potentiometer has a first terminal connected to a 5 Volt supply. To provide digital values which may be processed by the host computer, a second terminal of the joystick potentiometer is connected to a joystick port interface.

As illustrated in FIG. 1, the prior art joystick port interface 120 (illustrated for a single coordinate axis only, e.g., the X-axis) includes a quad timer 126 and a "recommended" Resistor-Capacitor (RC) network having a resistor 122 (typically R=2.26 kilohms) and a capacitor 124 (typically C=10 nF). A first terminal of the RC network resistor 122 is serially coupled to the joystick potentiometer 112, while the other terminal of the RC network resistor 122 is coupled to a node A. A first terminal of the RC network capacitor 124 is coupled to the node A, while the other terminal of the RC network capacitor 124 is connected to ground. The quad timer 126 is coupled to the node A, and receives the analog voltage level, JSout, across the RC network capacitor 124. The quad timer 126 includes an analog comparator (not shown) which compares JSout with a predetermined threshold voltage Vt (typically 3.34 Volts) and outputs a pulse signal $P_i$ to the host computer.

Upon receiving a request from the host computer, the quad timer 126 discharges the RC network capacitor 124 and sets $P_i$ to a logic "1" level. As current passes though the joystick potentiometer 112, the RC network capacitor 124 charges until Vt is reached. At this time the quad timer 126 sets $P_i$ back to a logic "0" level. The pulse width of $P_i$ thus represents the time interval, T, required to charge the RC network capacitor 124 to the threshold voltage Vt. The pulse width of $P_i$ is monitored by the host computer to indicate the resistance of the joystick potentiometer 112 which, as discussed above, has a direct relation to the coordinate position of the joystick 110.

For the conventional joystick port interface described above, both the joystick 110 and the quad timer 126 utilize a 5 Volt power supply. The power supply for the next generation of integrated circuits, however, will be substantially less than 5 Volts, and therefore a low-power port is needed to interface the conventional 5 Volt joystick device with a lower-Volt integrated circuit such as a CMOS (complementary metal-oxide silicon) VLSI (very large-scale integration) circuit.

SUMMARY OF THE INVENTION

The joystick port interface according the present invention is a low power port which interfaces a typical 5 Volt joystick peripheral device with a lower power computer port. The low-voltage joystick port interface includes a bidirectional buffer circuit and a pulse generator which, together, generate a digital pulse signal, representing a joystick coordinate position, based on an input analog measurement signal.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
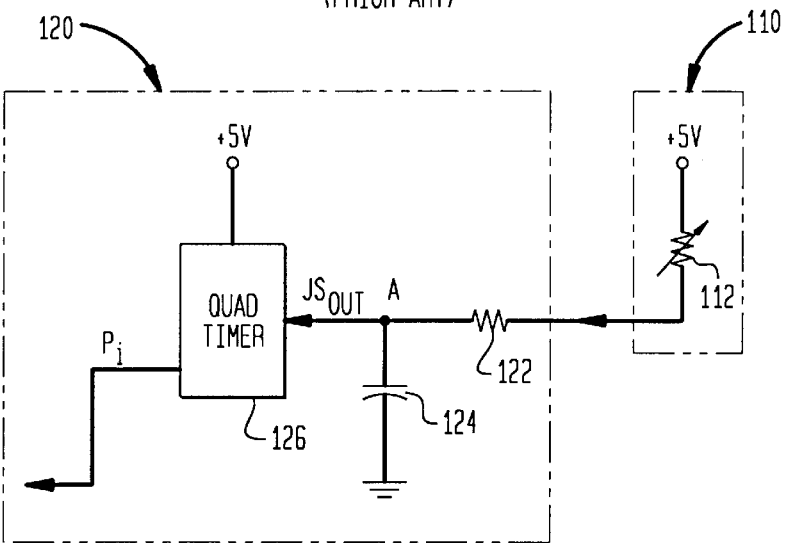
FIG. 1 illustrates a prior art joystick port interface.
Figure 2:
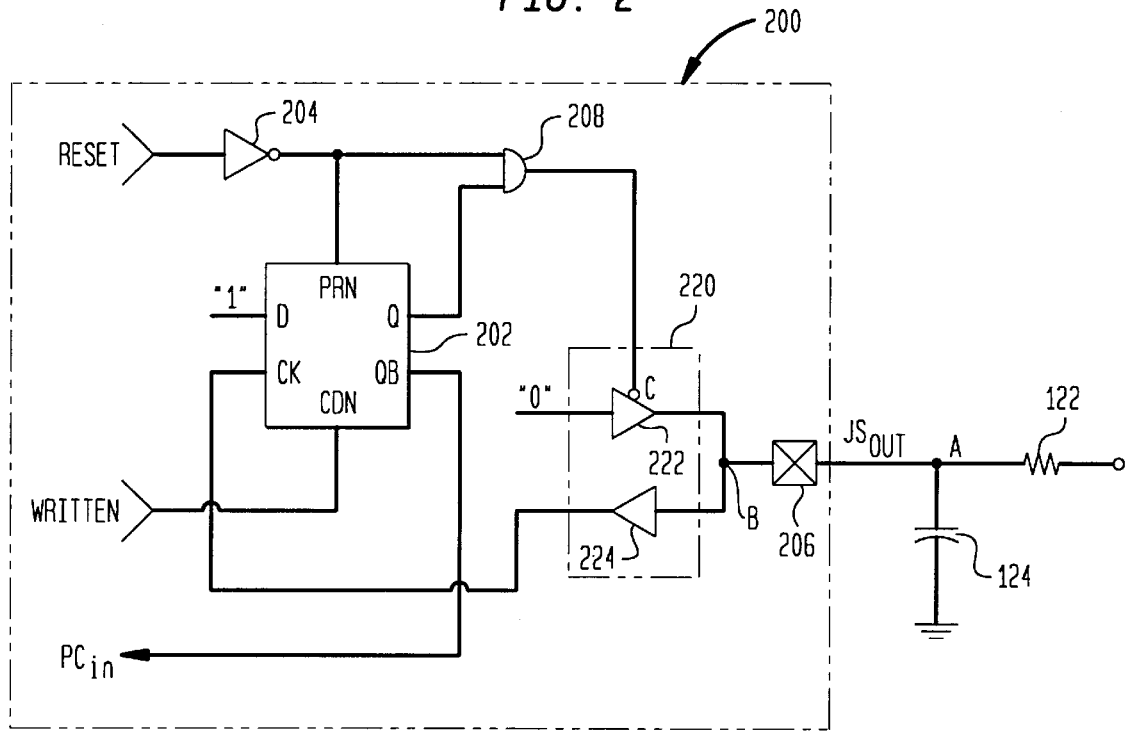
FIG. 2 illustrates the joystick port interface according to the present invention.

The following detailed description relates to a joystick port interface and a method of interfacing a standard-Volt (e.g., 5 Volt) joystick with a low-power processor (e.g., less than 5 Volt) port. For the purposes of discussion only, the processor will be described as being a host computer. FIG. 2 illustrates a joystick port interface according to the present invention. As shown in FIG. 2, the joystick port interface includes the RC network components discussed above with reference to FIG. 1, namely the RC network resistor 122 and the RC network capacitor 124. The joystick interface according to the present invention further includes a low-voltage interface circuit 200 which includes two main components: a latch 202 and a bidirectional buffer circuit 220. The bidirectional buffer circuit 220 includes a three-state buffer 222 and an input buffer 224. The interface circuit 200 further includes a bidirectional input/output (I/O) terminal 206 and certain logic elements, namely an inverter 204 and an AND gate 208.

The latch 202 is a D-type flip-flop having a total of four inputs: preset PRN, data D (fixed at a logic "1" level), clock CK, and clear CDN. The latch 202 has two outputs, Q and QB (the complement of Q). As will be described in detail below, the latch 202 functions as a pulse generator so that the output QB signal, which the host computer receives as a pulse signal PCin, represents the time interval, T, needed to charge the RC network capacitor 124 to a threshold voltage 20 level, Vtnew, of the input buffer 224.

The interface circuit 200 receives a pair of control signals from the host computer, namely a RESET signal and a WRITTEN signal. The latch 202 receives the WRITTEN signal from the host computer at the clear CDN input, and receives the RESET signal from the host computer at the preset PRN input via the inverter 204.

In other words, an input node of the inverter 204 directly receives the RESET signal from the host computer, and the inverter 204 outputs an inverted RESET signal to the preset PRN input of the latch 202.

The clock CK input of the latch 202 receives the output of the input buffer 224.

A first input node of the AND gate 208 receives the inverted RESET signal output by the inverter 204. 35 A second input node of the AND gate 208 receives the output Q signal from the latch 202. A control node C the three-state buffer 222 receives the output of the AND gate 208, and a data input node of the three-state buffer 222 is set to a logic "0" level. The output of the three-state buffer 222 is coupled to a node B, which also connects to one end of the bidirectional I/O terminal 206. The bidirectional I/O terminal 206 is connected to the node A of the external RC network described above with reference to FIG. 1 so that JSout is received by the interface circuit 200.

The three-state buffer 222 operates in either a high impedance state (when the AND gate 208 outputs a logic "0" level signal) or an active state (when the AND gate 208 outputs a logic "1" level signal). In the high impedance state, the three-state buffer 222 essentially operates as an open circuit, thus allowing the RC network capacitor 124 to charge as current passes through the joystick potentiometer. On the other hand, when the three-state buffer 222 is active, it will always drive the I/O terminal 206 to ground, thus essentially acting as a pull-down device which causes the RC network capacitor 124 to discharge. In other words, the three-state buffer 222 has sufficient current sinking capability to overdrive the elements outside the interface circuit 200, and drive the I/O terminal 206 to ground.

The input buffer 224 has a threshold voltage level Vtnew (e.g., 3.3 Volts). When JSout is less than Vtnew, the input buffer 224 outputs a logic "0" level signal. On the other hand, when JSout exceeds Vtnew, the input buffer 224 outputs a logic "1" level signal.

Since JSout has a long time constant which can be susceptible to noise, the input buffer 224 has a hysteresis level that is greater than the expected noise level, thereby preventing short duration pulses from disrupting the joystick port operation.

The operation of the joystick port interface illustrated in FIG. 2 will be described as follows. The joystick port interface operates in a plurality of states which will be discussed in turn.

When idle, the joystick port interface is said to operate in a disabled state. During this disabled state, the host computer outputs a logic "1" level RESET signal to the inverter 204, and thus the three-state buffer 222 enters the high impedance state. More specifically, the first input node of the AND gate 208 receives a logic "0" level signal via the inverter 204.

Consequently, the AND gate 208 outputs a logic "0" control signal to the three-state buffer 222. As discussed above, when the control node C of the three-state buffer 222 receives a logic "0" level signal via the AND gate 208, the three-state buffer 222 enters a high-impedance state. During this state, JSout gradually rises as the RC network capacitor 124 charges, eventually reaching a maximum level of 5 Volts.

Because the host computer outputs a logic "1" level RESET signal during the disabled state, the preclear PRN input to the latch 202 receives a logic "0" level signal via the inverter 204, resulting in a logic "1" level output Q signal, regardless of the other inputs to the latch 202. Consequently, the pulse signal PCin received by the host computer is set to a logic "0" level, even when JSout exceeds the threshold voltage Vtnew of the input buffer 224.

Figure 3:
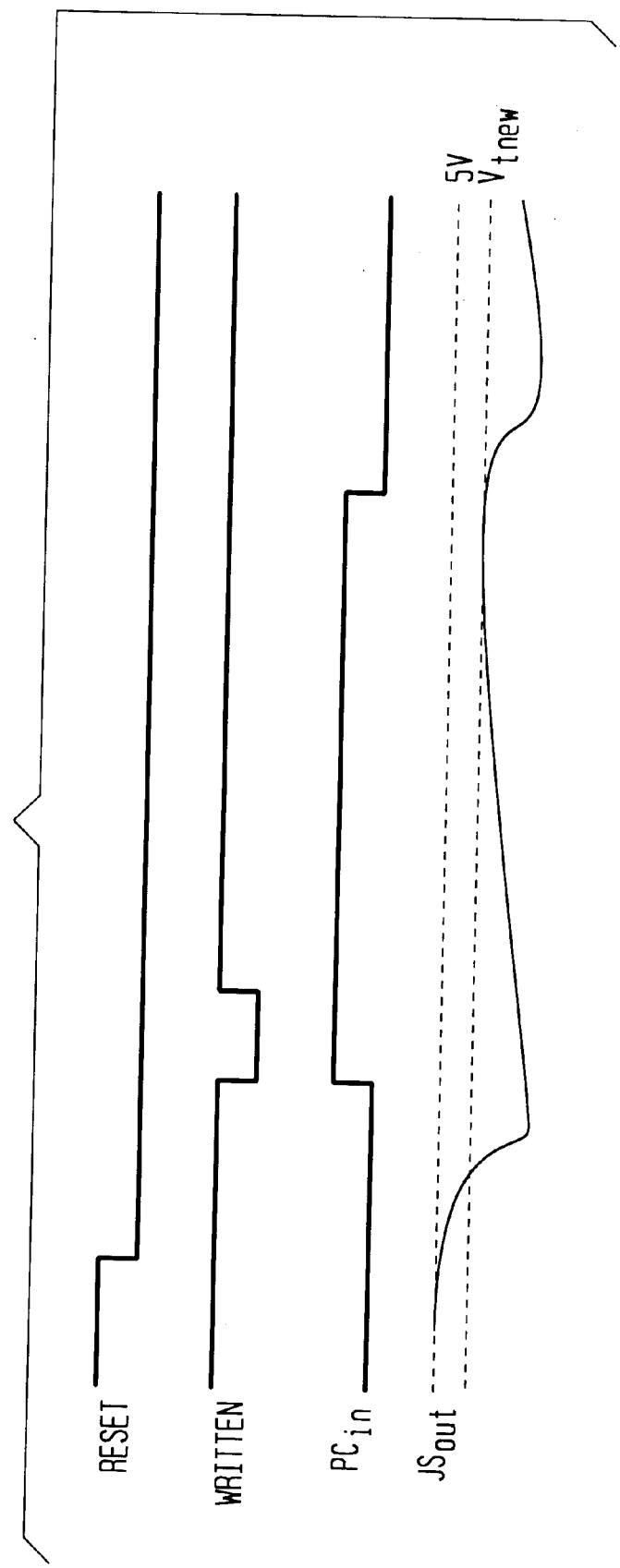
FIG. 3 illustrates the relationship between various signal levels of the joystick port interface illustrated in FIG. 2.

To enter a standby state, in which the joystick port interface is prepared to provide a joystick position pulse to the host computer, the host computer switches the RESET signal from a logic "1" level to a logic "0" level, and thus the first and second input nodes of the AND gate 208 respectively receive a logic "1" level signal from the inverter 204 and a logic "1" level signal from the output Q of the latch 202. Consequently, the AND gate 208 outputs a logic "1" level signal to the control node C of the three-state buffer 222. As described above, the three-state buffer 222 enters an active state when the control node C receives a logic "1" level signal from the AND gate 208, thereby driving the I/O terminal 206 to ground and causing the RC network capacitor 124 to discharge. As the RC network capacitor 124 discharges, JSout drops below the threshold voltage Vtnew of the input buffer 224 and the clock CK input of the latch 202 switches to a logic "0" level, thereby closing the latch 202. The output Q signal remains at a logic "1", level, and consequently the PCin signal remains at a logic "0" level as illustrated in FIG. 3.

After a sufficient time has passed for the RC network capacitor 124 to fully discharge, the joystick port interface has reached the standby state. When the host computer subsequently requests a joystick position pulse, the joystick port interface is said to operate in a pulse-generating state. To initiate this pulse-generating state, the host computer switches the WRITTEN signal from a logic "1" level to a logic "0" level, and then back to a logic "1" level as illustrated in FIG. 3. When the WRITTEN signal is at a logic "0" level, the clear CDN input to the latch 202 is at a logic "0" level so that the output Q signal of the latch 202 switches to a logic "0" level, regardless of the remaining inputs to the latch 202 (i.e., the latch 202 clears) and the pulse signal PCin is at a logic "1" level as illustrated in FIG. 3. Since the output Q signal is at a logic "0" level, the AND gate 208 again outputs a logic "0" level signal to the three-state buffer 222, thereby rendering the three-state buffer 222 inactive and allowing the RC network capacitor 124 to charge.

When JSout reaches Vtnew, the input buffer 224 outputs a logic "1" level signal to the clock CK input of the latch 202, thus opening the latch 202. In other words, the output Q signal of the latch 202 switches from a logic "0" level to a logic "1" level, and consequently the pulse signal PCin switches back from a logic "1" level to a logic "0" level as illustrated in FIG. 3. The duration that PCin remains at a logic "1" level indicates the joystick potentiometer resistance for the corresponding coordinate axis.

The output of the AND gate 208 again switches from a logic "0" level to a logic "1" level, causing the three-state buffer 222 to switch from the high impedance state to the active state. Consequently, the three-state buffer 222 again drives the I/O terminal 206 to ground, causing the RC network capacitor 124 to discharge. Therefore, the joystick port interface automatically returns to the standby state and is ready for subsequent attempts to sense the joystick coordinate positions. The operation described above automatically reconfigures the joystick port interface to the standby state in which the output Q signal of the latch 202 is a logic "1" level and the RC network capacitor 124 discharges. Consequently, the joystick port interface does not "lockup" in an unusable state.

The joystick port interface described above can be implemented using all standard CMOS VLSI structures, without requiring special design tolerances. Furthermore, this implementation results in zero power dissipation when disabled and prevents the joystick port interface from entering into an unrecoverable state.

As a final matter, although Vtnew has been shown by way of example as being 3.3 Volts, other values for Vtnew are acceptable. For example, Vtnew may be substantially less than 3.3. Volts (e.g., 2.5 Volts). Naturally, the time required for Jsout to reach the input buffer threshold level ("rise time") will vary in direct relation to Vtnew. The pulse width of the PCin signal, which represents rise time, however, should not be less than or exceed expected minimum/ maximum pulse width values. Therefore, to ensure optimal joystick position sensing, the capacitance ("Cnew") of the RC network capacitor 124 may be selected in relation to Vtnew.

In other words, Cnew is set so that the pulse width of PCin conforms to expected minimum/maximum values. Specifically, Cnew is selected according to the following formula:

$$Cnew = \frac{11nF}{\ln\left(\frac{5V}{5V - Vtnew}\right)} \text{ for } Vtnew < 5.0 \text{ Volts.} \quad (1)$$

As mentioned above, Cnew represents the new capacitance of the RC network capacitor 124 and Vtnew represents the threshold level of the input buffer 224.

The invention being thus described, it will be obvious to one skilled in the art that the same may be varied in many ways. Such variations are not to be regarded as a departure from the spirit and scope of the invention, and all such modifications are intended to be included within the scope of the following claims.

What is claimed is:

1. An interface between a joystick device having a first source voltage and a processor, comprising:
   a Resistor-Capacitor (RC) network, connected to the joystick device, said RC network having a capacitor that generates an analog joystick position measurement signal; and
   an interface circuit having a second source voltage that is lower than the first source voltage, including
      a buffer circuit, in a first operation mode of said interface, receiving said analog joystick position measurement signal, outputting a first logic state as a digital signal before said analog joystick measurement signal exceeds said predetermined threshold, and outputting a second logic state as said digital signal after said analog joystick measurement signal exceeds said predetermined threshold; and
      a pulse generator generating a pulse based on said digital signal in said first operation mode of said interface, a width of said pulse representing a coordinate position of said joystick device, the capacitance value of said capacitor being a function of said predetermined threshold that prevents deviation of the width of said pulse from expected values.

2. The interface of claim 1, wherein said pulse generator enters a disabled state in response to a control signal from said processor, and said pulse generator does not generate said pulse in said disabled state and does not dissipate power in said disabled state.

3. The interface of claim 1, wherein said buffer circuit is connected to a charge storage device, and places said charge storage device in a discharged state in a second operation mode of said interface.

4. The interface of claim 3, wherein said buffer circuit permits said charge storage device to begin charging in said first operation mode of said interface.

5. The interface of claim 3, wherein said pulse generator enters a disabled state in response to a control signal from said processor in said second operation mode of said interface, and said pulse generator does not generate said pulse in said disabled state.

6. The interface of claim 1, wherein said pulse generator is a latch.

7. The interface of claim 6, wherein said latch is cleared at a beginning of said first operation mode of said interface by a control signal from said processor, and said latch stores a logic "1" when said digital signal is said second logic state.

8. The interface of claim 1, wherein said RC network capacitor is preselected as a function of said predetermined threshold to satisfy the formula:

$$Cnew = \frac{11nF}{\ln\left(\frac{5V}{5V - Vtnew}\right)} \text{ for } Vtnew < 5.0 \text{ Volts,}$$

where Cnew represents the capacitance of the RC network capacitor, and Vtnew represents said predetermined threshold.

9. A processor based system, comprising:
   a processor;
   a joystick device having a first source voltage; and
   an interface interfacing said joystick device with said processor, said interface including,
      a Resistor-Capacitor (RC) network, connected to the joystick device, said RC network having a capacitor that generates an analog joystick position measurement signal; and
      an interface circuit having a second source voltage that is lower than the first source voltage, including
         a buffer circuit, in a first operation mode of said interface, receiving said analog joystick position measurement signal, outputting a first logic state as a digital signal before said analog joystick measurement signal exceeds said predetermined threshold, and outputting a second logic state as said digital signal after said analog joystick measurement signal exceeds said predetermined threshold, and
         a pulse generator generating a pulse based on said digital signal in said first operation mode of said interface, a width of said pulse representing a coordinate position of said joystick device, and outputting said pulse to said processor, wherein the capacitance value of said capacitor is a function of said predetermined threshold that prevents deviation of the width of said pulse from expected values.

10. The processor based system of claim 9, wherein said pulse generator enters a disabled state in response to a control signal from said processor, and said pulse generator does not generate said pulse in said disabled state and does not dissipate power in said disabled state.

11. The processor based system of claim 9, wherein said buffer circuit is connected to a charge storage device, places said charge storage device in a discharged state in a second operation mode of said interface, and permits said charge storage device to begin charging in said first operation mode of said interface.

12. The processor based system of claim 9, wherein said pulse generator is a latch, said latch is cleared at a beginning of said first operation mode of said interface by a control signal from said processor, said interface by a control signal from said processor, and said latch stores a logic "1" when said digital signal is said second logic state.

13. The interface of claim 9, wherein said RC network capacitor is preselected as a function of said predetermined threshold to satisfy the formula:

$$Cnew = \frac{11nF}{\ln\left(\frac{5V}{5V - Vtnew}\right)} \text{ for } Vtnew < 5.0 \text{ Volts,}$$

where Cnew represents the capacitance of the RC network capacitor, and Vtnew represents said predetermined threshold.

14. A method of interfacing a joystick device having a first source voltage with a processor, comprising:
  (a) receiving an analog joystick measurement signal from a Resistor-Capacitor (RC) network connected to the joystick device, said RC network having a capacitor that generates said analog joystick measurement signal;
  (b) generating a digital signal, the logic level of said digital signal being set based on whether said analog joystick measurement signal exceeds a predetermined threshold level, said digital signal being generated by an interface circuit having a second source voltage that is lower than the first source voltage;
  (c) outputting said digital signal to a pulse generator;
  (d) generating a pulse based on the logic level of said first digital signal, a width of said pulse representing a coordinate position of said joystick device; and
  (e) outputting said pulse to said processor,
  wherein the capacitance value of said capacitor is a function of said predetermined threshold level that prevents deviation of the width of said pulse from expected values.

15. The method of claim 14, wherein
  said steps (a)–(e) are performed in a first mode of operation;
  and further including,
  (f) placing said capacitor in a discharged state in a second mode of operation.

16. The method of claim 15, further comprising:
  (g) permitting said charge storage device to begin charging in said first mode of operation.

17. The method of claim 15, further comprising:
  (g) prohibiting said steps (d) and (e) in response to a control signal from said processor in said second mode of operation.

18. The method of claim 14, further comprising:
  (f) prohibiting said steps (d) and (e) in response to a control signal from said processor.

19. The method of claim 14, wherein the capacitance value of said capacitor satisfies the formula:

$$Cnew = \frac{11nF}{\ln\left(\frac{5V}{5V - Vtnew}\right)} \text{ for } Vtnew < 5.0 \text{ Volts,}$$

where Cnew represents the capacitance of the RC network capacitor, and Vtnew represents said predetermined threshold level.

* * * * *

(12) EX PARTE REEXAMINATION CERTIFICATE (9066th)
United States Patent
Fadavi-Ardekani et al.

(10) Number: US 6,297,751 C1
(45) Certificate Issued: Jun. 12, 2012

(54) LOW-VOLTAGE JOYSTICK PORT INTERFACE

(75) Inventors: Jalil Fadavi-Ardekani, Newport Coast, CA (US); Raymond S. Livingston, Bonny Doon, CA (US); Richard J. Niescier, Bethlehem, PA (US); David L. Potts, Royersford, PA (US)

(73) Assignee: Fenner Investments, Ltd., Richardson, TX (US)

Reexamination Request:
No. 90/009,368, Dec. 22, 2008

Reexamination Certificate for:
Patent No.: 6,297,751
Issued: Oct. 2, 2001
Appl. No.: 09/113,503
Filed: Jul. 10, 1998

(51) Int. Cl.
*H03L 5/00* (2006.01)
*H03K 17/94* (2006.01)

(52) U.S. Cl. .................... 341/20; 327/100; 327/142; 327/333; 345/101

(58) Field of Classification Search .................. None
See application file for complete search history.

(56) References Cited

To view the complete listing of prior art documents cited during the proceeding for Reexamination Control Number 90/009,368, please refer to the USPTO's public Patent Application Information Retrieval (PAIR) system under the Display References tab.

*Primary Examiner* — Joseph R. Pokrzywa

(57) ABSTRACT

The joystick port interface includes an integrated circuit receiving an analog joystick position measurement signal and outputting a digital pulse signal to a processor which signifies a joystick coordinate value. The integrated circuit includes a pulse generator and a bidirectional buffer circuit. The bidirectional buffer circuit receives the analog joystick position measurement signal and selectively discharges an RC network capacitor which provides this analog measurement. This implementation provides a joystick port which uses low-voltage CMOS VLSI structures which can interface a conventional high-voltage joystick with the processor.

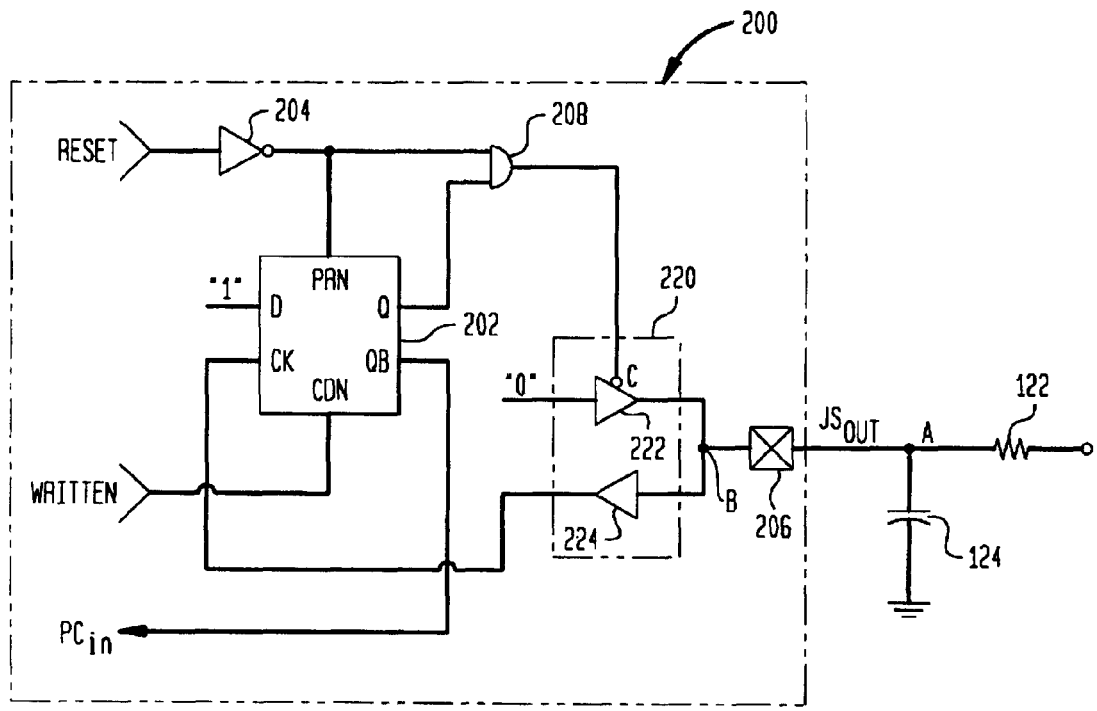

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-19 are cancelled.

* * * * *